(12) United States Patent
Quensel et al.

(10) Patent No.: US 6,473,614 B1
(45) Date of Patent: Oct. 29, 2002

(54) METHOD AND MEANS FOR DETERMINING A HANDOVER IN A RADIO COMMUNICATION SYSTEM

(75) Inventors: Joakim Quensel, Kuala Lumpur (MY); Petter Ljung, Stockholm (SE)

(73) Assignee: Telefonaktielbolaget LM Ericsson, Stockholm (SE)

( * ) Notice: Subject to any disclaimer, the term of this patent is extended or adjusted under 35 U.S.C. 154(b) by 0 days.

(21) Appl. No.: 09/465,768

(22) Filed: Dec. 17, 1999

(30) Foreign Application Priority Data

Dec. 18, 1998 (SE) .............................. 9804426

(51) Int. Cl.$^7$ .............................. H04Q 7/20
(52) U.S. Cl. .............. 455/436; 455/69; 455/70; 455/422; 455/442; 455/456; 455/561
(58) Field of Search .............. 455/522, 69, 70, 455/13.4, 427, 436, 456, 438, 437, 561, 422, 442, 443, 375, 331, 332, 333

(56) References Cited

U.S. PATENT DOCUMENTS

| | | | | |
|---|---|---|---|---|
| 5,267,261 A | * | 11/1993 | Blakeney | 375/1 |
| 5,673,307 A | | 9/1997 | Holland et al. | 379/60 |
| 5,722,073 A | * | 2/1998 | Wallstedt et al. | 455/436 |
| 5,862,451 A | * | 1/1999 | Grau et al. | 348/192 |
| 5,901,354 A | * | 5/1999 | Menich | 455/442 |
| 5,907,807 A | * | 5/1999 | Chavez | 455/436 |
| 5,930,721 A | * | 7/1999 | Fried et al. | 455/437 |
| 6,038,448 A | * | 3/2000 | Chheda | 455/436 |
| 6,049,716 A | * | 4/2000 | Jung | 455/442 |
| 6,115,608 A | * | 9/2000 | Duran | 455/436 |
| 6,148,194 A | * | 11/2000 | Kao et al. | 455/421 |
| 6,202,059 B1 | * | 3/2001 | Thompson et al. | 706/46 |
| 6,295,451 B1 | * | 9/2001 | Mimura | 455/436 |

FOREIGN PATENT DOCUMENTS

| | | |
|---|---|---|
| EP | 0530165 | 3/1993 |
| EP | 0866628 | 3/1997 |
| GB | 2297885 | 8/1996 |
| WO | WO9619088 | 6/1996 |
| WO | WO9706648 | 2/1997 |

* cited by examiner

Primary Examiner—Edward F. Urban
Assistant Examiner—Khawar Iqbal
(74) Attorney, Agent, or Firm—Burns, Doane, Swecker & Mathis, L.L.P.

(57) ABSTRACT

The present invention relates to methods and means for determining handovers in a cellular radio communication system. Power-budgets for a serving and a target cell are calculated (301,302). A ranking value for both cells is determined from the power-budgets (306,307). A new ranking value for the target cell is calculated (309) by adding a specific adjustment value, dependent on the BER in the serving cell and the target cell and derived from a communication-quality table, to the ranking value of the target cell. A handover is performed if the new ranking value exceeds the ranking value of the serving cell.

15 Claims, 6 Drawing Sheets

METHOD AND MEANS FOR DETERMINING A HANDOVER IN A RADIO COMMUNICATION SYSTEM

This application claims priority under 35 U.S.C.§§119 and/or 365 to 9804426-6 filed in Sweden on Dec. 18, 1998; the entire content of which is hereby incorporated by reference.

TECHNICAL FIELD OF THE INVENTION

The present invention relates in general to the field of cellular radio communication and, in particular, to methods and means for determining a handover in a cellular radio communication system.

DESCRIPTION OF RELATED ART

By "radio unit" is meant all portable and non-portable equipment intended for radio communication, like mobile/cellular phones, transceivers, pagers, telex, electronic notebooks, laptops with integrated radios, communicators, computers, routers, tailored microchips or any other electronic equipment using a radio link as a mean of communication. These equipments can be used in any type of radio communication system, such as cellular networks, satellite or small local networks.

Cellular radio communication systems are commonly employed to provide voice and data communications to a plurality of radio units or subscribers.

A cellular radio communication system, e.g. AMPS, NMT, D-AMPS, GSM, DECT and IS-95 (CDMA), generally includes one or more radio units, one or more base stations (e.g. base station transceivers), one or more base station controllers (BSC) and at least one mobile switching centre (MSC). A typical cellular radio communication system may include hundreds of base stations, thousands of radio units and more than one mobile switching centre.

The mobile switching centre and the plurality of base stations associated therewith generally define the cellular radio network.

The cellular radio network which cover a certain geographical area is typically divided into cells or regions, i.e. a part of the geographical area. The cells typically include a base station and the radio units with which the base station is in communication. The cell associated with the particular base station with which a radio unit is communicating is commonly called the serving cell.

Each cell will have allocated to it one or more voice/data and/or traffic channels and in some cases one or more dedicated control channels. These channels are used for communication between the base station and the radio units within the cell. For example, a typical cell of a GSM digital cellular radio network has one digital control channel and 21 voice/data or traffic channels.

Note that "channel" may refer to a specific carrier frequency in an analogue system, e.g. AMPS and NMT, a specific carrier/slot combination in a hybrid TDMA/FDMA system, e.g. GSM, and one or more assigned codes in a CDMA system.

A connection is an established communication path between two points over a determined communication channel.

A need to change the connection between the radio unit and the base station in the serving cell to a new base station in a neighbouring cell can occur due to the mobility of the radio units and poor radio quality on the channels. The process of transferring the connection, e.g. the call, from one cell to another cell is called handover, i.e. to switch the communication on a channel in the serving cell to another channel in a neighbouring cell. The specific neighbouring cell to which the handover is going to be made is commonly called the target cell.

Today the decision to make a handover is mainly made on power-budget calculations where the cell with the best Carrier to Noise ratio (C/N) (the best power-budget) is selected to serve the radio unit. In many situations this measure is not adequate.

Due to the high interference levels (C/I) in today's mobile networks the communication quality (e.g. bit error rate) cannot be estimated by C/N only. Instead it is essential to base the handover decisions on a combination of the measure of C/N (power budget) and the BER.

The power-budget for a cell can be determined from the received signal strength in a radio unit and its sensitivity or the received signal strength in a base station and the sensitivity of the receiver in the base station.

The U.S. Pat. No. 5,673,307 describes a method, system and an apparatus for handover in a cellular mobile system. A mobile unit measures the BER and signal strength from the current base station and the neighbouring base stations. A handover is performed if the measured signal strength from a neighbouring base station is higher than the measured signal strength from the current base station. If this is not the case, the BER is checked. If the BER is above a certain level a low signal-strength handover-threshold is selected and if the BER is below said level a high signal-strength handover-threshold is selected. A handover is then performed if the signal strength from a neighbouring base station is higher than the signal-strength handover-threshold.

The European patent application EP 0530165 describes a method, system and an apparatus for call set-up and handover in a cellular mobile radio system. The signal strength from a current base station and neighbouring base stations are measured. If the signal strength from a neighbouring base station is higher than the signal strength from the current base station a handover is performed. The BER is checked and if there are any bit errors a counter is incremented. If the counter has reached a certain value and if a certain time out limit is not exceeded a handover to a new channel in the same base station is performed. If the BER is equal to zero, new comparisons with signal strengths from different base stations are performed and a handover is made either to a new base station or to a new channel in the same base station.

The UK patent application GB 2297 885 describes a method and an apparatus for channel estimation in a cellular mobile radio system. An average value during a certain time period of the signal strength and the BER is used to estimate if the quality on a radio channel is decreasing. A channel change request is generated if the quality is estimated to be degraded.

As will be seen herein, each of the methods and means disclosed in these patents is of different types and construction than the methods and means of the present invention.

SUMMARY

The present invention meets a problem related to handover procedures.

The problem occurs when a handover is to be performed on a connection based on the received signal strength only and irrespective of the communication quality of the connection.

In light of the foregoing, a primary object of the present invention is to provide methods and means for determining a handover where the communication quality has the major influence on the handover decision.

Another object of the present invention is to provide methods and means for gradual and flexible handover performance in a shifting radio environment.

In a method according to the present invention power-budgets for the serving and neighbouring cells are calculated. The power-budgets for the neighbouring cells are then adjusted by specific quality adjustment values that are determined by the communication-quality of the cells. A handover decision is then dependent on the values of the adjusted power-budgets of the neighbouring cells.

According to one embodiment of the method the signal strength in the serving cell and from neighbouring cells are measured. The communication-quality in the serving cell is also measured. Power-budgets are calculated and a number of ranking values are determined for the cells. New ranking values for the neighbouring cells are calculated by using communication-quality adjustment values. A handover is determined to be performed to a specific neighbouring cell if the new ranking value for said specific neighbouring cell exceeds the ranking value in the serving cell.

The inventive method is therewith characterised as it appears from the appended claim 1.

An arrangement for utilising the method according to the present invention is characterised as it appears from the appended claim 12.

An advantage with the present invention is that it is possible to handle a number of different levels of bad quality on a connection.

Another advantage is that it is possible to improve the quality of a connection by letting a radio unit be in contact with the base station that offers the best communication-quality and not only the base station offering the best Carrier to Noise ration.

Yet another advantage is that the number of handovers can be reduced.

Still another advantage is that neighbouring cells with a good communication quality can be favoured by early handovers and neighbouring cells with a bad communication quality can be disfavoured by late handovers.

DETAILED DESCRIPTION OF EMBODIMENTS

The present invention relates to methods and means for determining handovers in a cellular radio communication system.

Figure 1A:
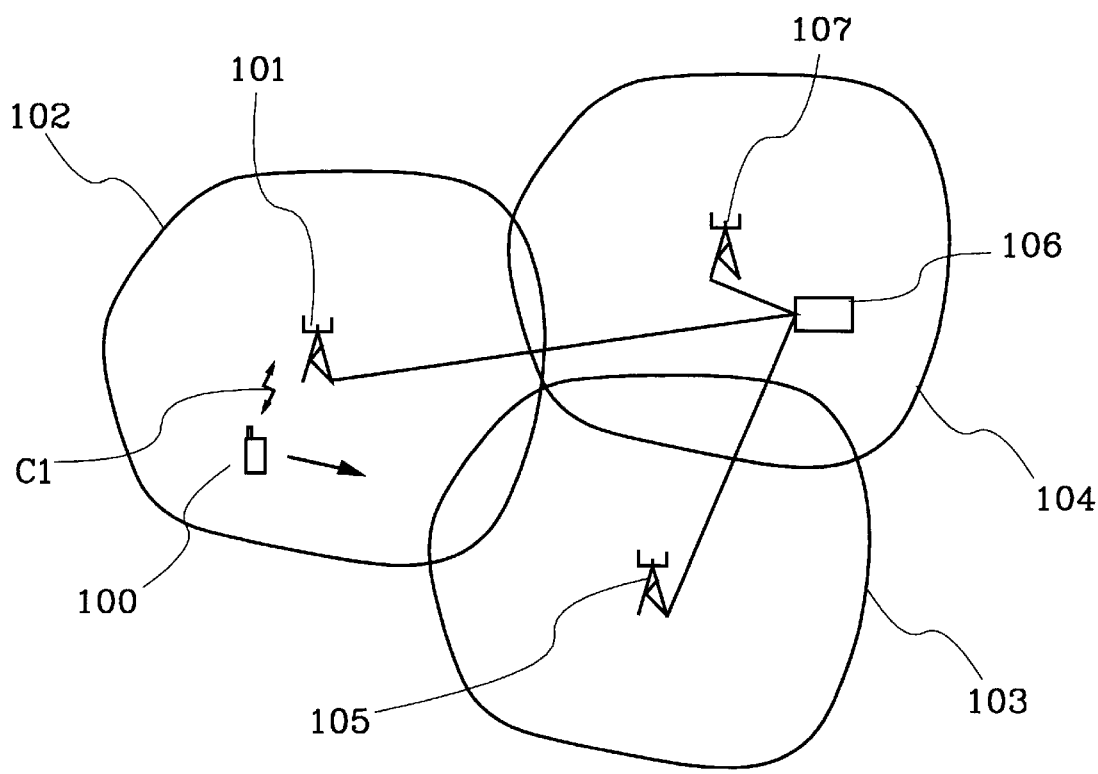
FIG. 1a is illustrating a scenario in a cellular radio communication system before a handover.
Figure 1B:
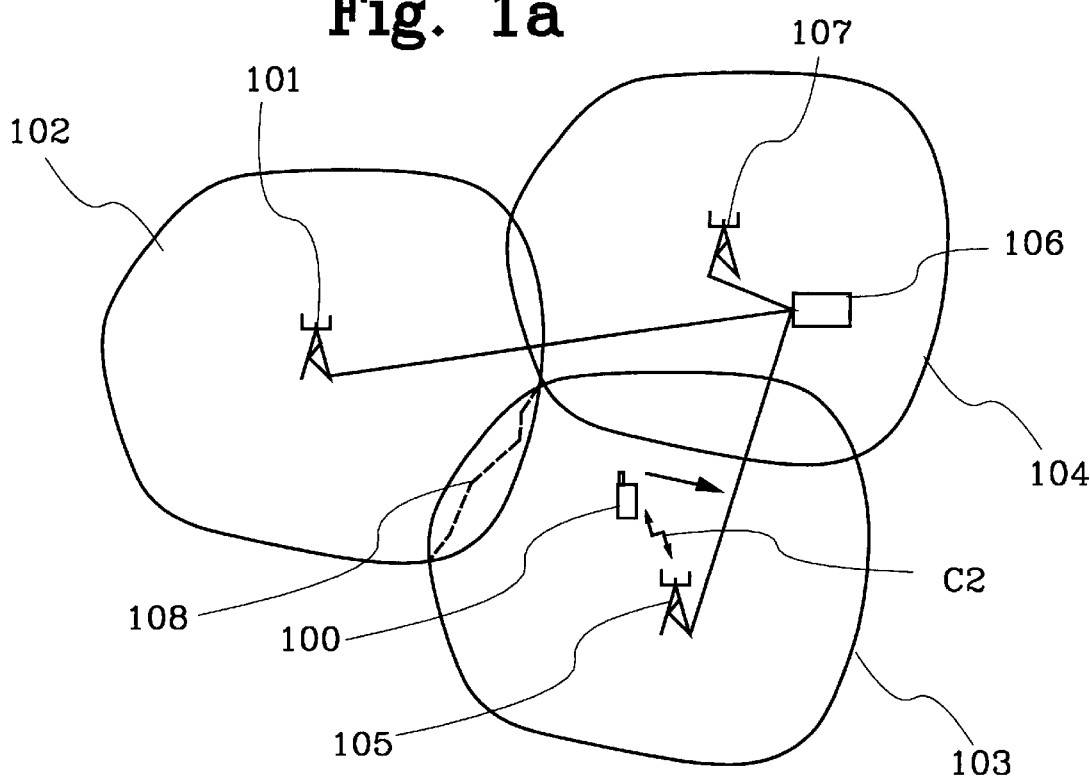
FIG. 1b is illustrating a scenario in a cellular radio communication system after a handover.

FIGS. 1a–b illustrate an example of a common handover scenario in the same cellular radio communication system.

In FIG. 1a, which shows a scenario before handover, a radio unit 100 is communicating with a first base station 101 (also called a base transceiver station, BTS) on a first connection C1 in a first cell 102. The first cell 102 is therefore called a serving cell 102. A first and a second neighbouring cell 103, 104 respectively are situated next to and partly overlapping the serving cell 102. The first neighbouring cell 103 is served by a second base station 105 and the second neighbouring cell 104 is served by a third base station 107. The radio unit 100 is moving in the serving cell 102 towards the first neighbouring cell 103. The base stations 101, 105 and 107 respectively are connected to a base station controller BSC 106 which controls such functions as handover decision and power control. The BSC 106 can be connected to other BSC's and/or MSC's (Mobile Switching Centres or Mobile services Switching Centres). The BSC 106 determines if, how and when a handover is to be performed when the radio unit 100 is moving from the serving cell 102 into the first neighbouring cell 103. The first neighbouring cell 103 is also called a target cell.

In FIG. 1b, which shows a scenario after handover, the handover has been performed and the radio unit 100 is now communicating with the second base station 105 over a second connection C2. The first neighbouring cell 103 has now become a serving cell for the radio unit 100.

As previously described a common solution to determine when a handover is to be performed is to calculate power-budgets (pbgt) for the cells. A power-budget is a value commonly given in decibel (dB). The cell with the best power-budget (the highest power-budget value) is considered to be the best cell and the base station serving that cell should therefore communicate with the radio unit. The border where two cells have equal power-budgets is called the power-budget handover border. The power-budget handover border 108 between the serving cell 102 and the neighbouring cell 103 is illustrated with a dashed line in FIG. 1b.

The power-budget for a cell can be determined by calculating the power-budget on the up-link, the down-link or on both the up-and the down-link which is well known in the art. If the power-budget is calculated for both up- and down-link in a cell it is common to choose the worst of these two power-budgets (the lowest power-budget value)as the power-budget for the cell. An example of a down-link power-budget is: $pbgt_{dL} = RSS_{(RU)} - sens_{(RU)}$ [dB] where $RSS_{(RU)}$ is the received signal strength in the radio unit and $sens_{(RU)}$ is the radio unit sensitivity. An example of an up-link power-budget is: $pbgt_{uL} = RSS_{(BTS)} - sens_{(BTS)}$ [dB] where $RSS_{(BTS)}$ is the received signal strength in the base station and $sens_{(BTS)}$ is the sensitivity of the receiver in the base station. The received signal strength $RSS_{(BTS)}$ in the base station can either be measured by the base station or estimated from the received signal strength $RSS_{(RU)}$ in the radio unit. This is well known in the art.

Figure 2:
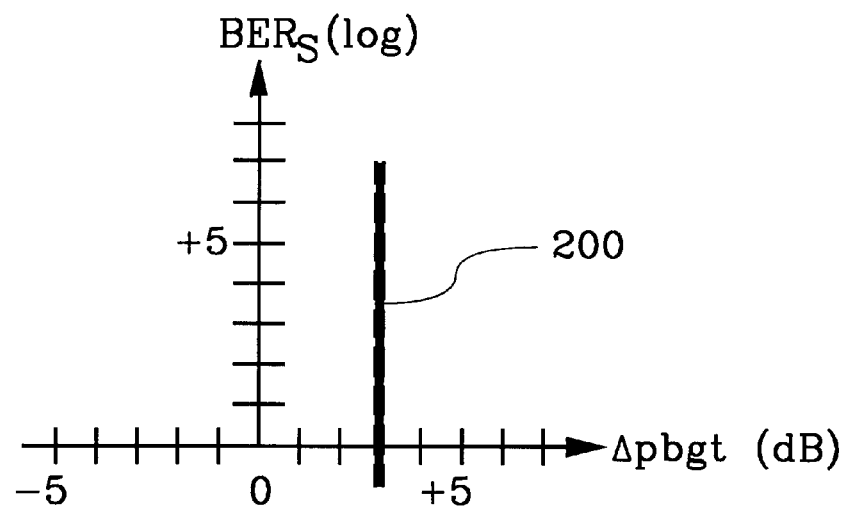
FIG. 2 is illustrating a power-budget characteristic at a handover border.

FIG. 2 illustrates a power-budget characteristic at a handover border 200. The x-axis represents the power-budget difference $\Delta pbgt = pbgt_T - pbgt_S$ between the serving cell 101 and the neighbouring cell 103, where the $pbgt_T$ is the power-budget of the neighbouring cell and the $pbgt_S$ is the power-budget of the serving cell. The y-axis represents the BER (Bit Error Rate) expressed in a logarithmic scale. A handover is performed when the radio unit 100 crosses the power-budget handover border and the neighbouring cell gets a better power-budget than the serving cell ($\Delta pbgt > 0$).

To prevent handovers back and forth between two cells for a radio unit situated between said cells a handover margin of e.g. 3 dB is used. Hence the characteristics of the power-budget handover border 200 is moved 3 dB to the right in FIG. 2.

In the description of the invention below we will for simplicity refer to the power-budget of the cell regardless of weather it is calculated on the up-link, down-link or on both of these links. As an example, a power-budget ($pbgt_S$) for the serving cell 102 is referred to as the power-budget $pbgt_S$. This power-budget can either be calculated on the down-link (as $pbgt_{dL}$), on the up-link (as $pbgt_{uL}$) or on both of these links whereby the power-budget of the serving cell $pbgt_S$ is equal to $pbgt_{dL}$ if $pbgt_{uL} > pbgt_{dL}$ or equal to $pbgt_{uL}$ if $pbgt_{uL} < pbgt_{dL}$. The same applies for the power-budgets ($pbgt_{Nx}$) of the neighbouring cells.

Figure 3A:
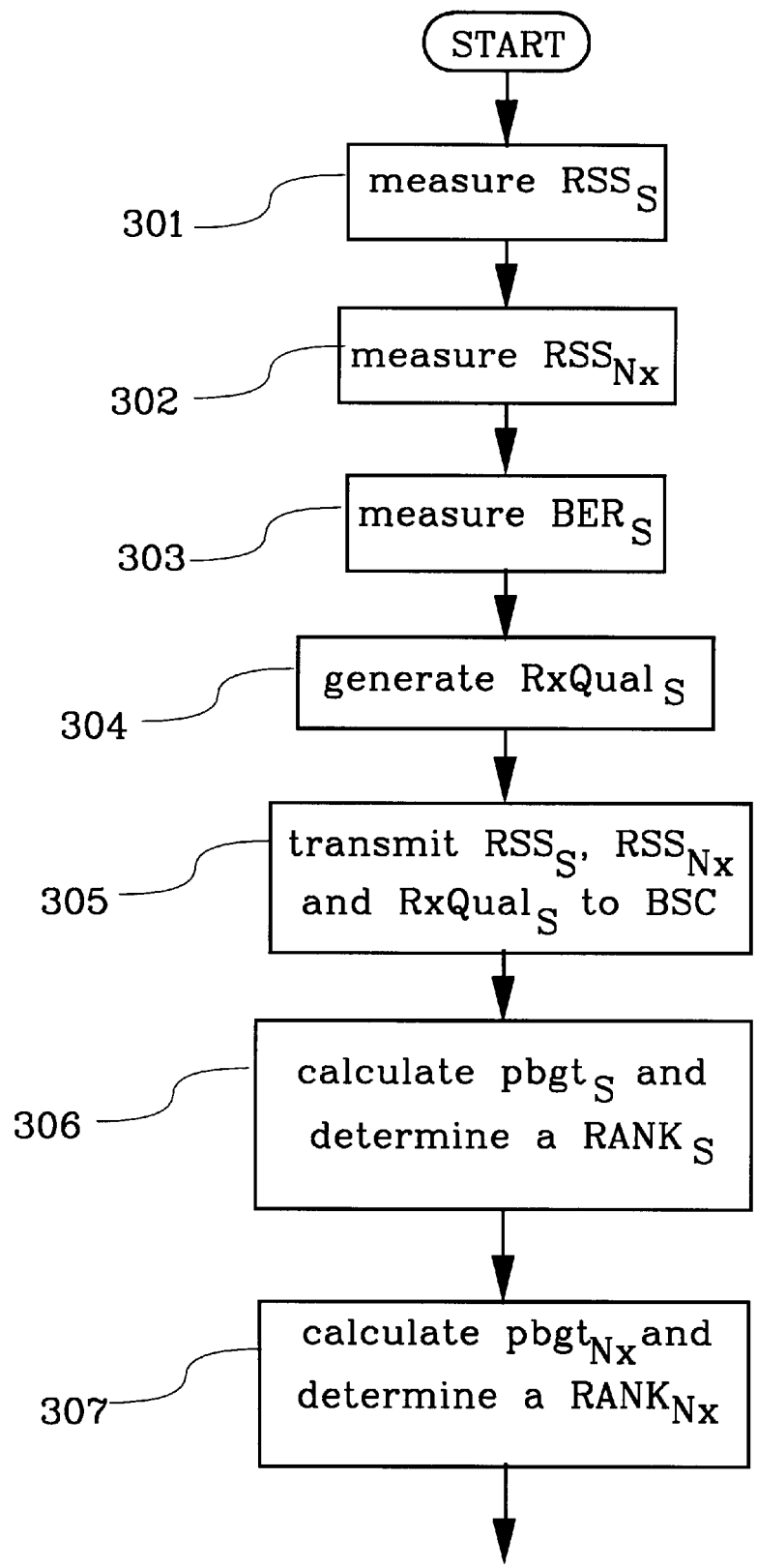
FIGS. 3a–b are illustrating a flow chart of a first embodiment of a method according to the present invention.
Figure 3B:
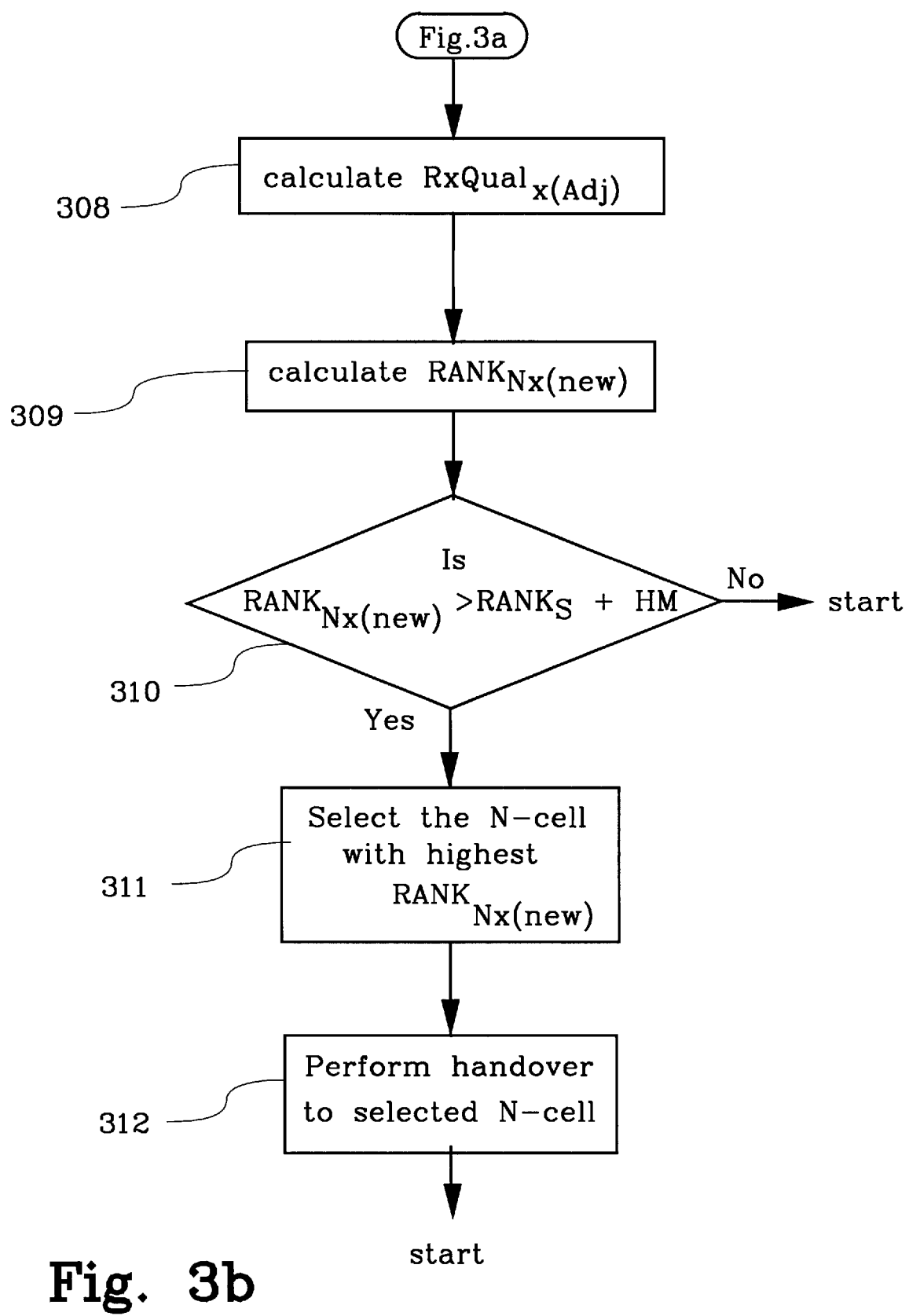

FIGS. 3a–b illustrates a flow chart of a first embodiment of the method according to the present invention performed in the scenarios according to FIGS. 1a–b.

According to a step 301 in FIG. 3a, the received signal strength on the down-link ($RSS_{S(RU)}$) in the serving cell 102 of FIG. 1a is measured by the radio unit 100. The received signal strength in the serving cell 102 can as an alternative be measured by the base station 101 in FIG. 1a or by both the radio unit and the base station.

According to a step 302, the received signal strength ($RSS_{Nx}$) from each neighbouring cell is measured on the down-link. The $_x$ in $RSS_{Nx}$ stands for an integer representing a specific neighbouring cell, e.g. $RSS_{N1}$ for the first neighbouring cell 103. The radio unit 100 measures the received signal strength from the first neighbouring cell 103 ($RSS_{N1(RU)}$) in FIG. 1a and the received signal strength from the second neighbouring cell 104 ($RSS_{N2(RU)}$) in FIG. 1a.

According to a step 303, the bit error rate ($BER_S$) in the serving cell 102 is measured. The radio unit 100 measures the bit error rate on the down-link ($BER_{S(RU)}$) and the first base station 101 measures the bit error rate on the up-link ($BER_{S(BTS)}$).

According to a step 304, a communication-quality value ($RxQual_S$) is generated for both up-link ($RxQual_{S(BTS)}$) and down-link ($RxQual_{S(RU)}$). The radio unit 100 generates the $RxQual_{S(RU)}$ value by transforming the $BER_{S(RU)}$ measured in step 303 to a logarithmic value between 0–7. The first base station 101 generates in the same way the $RxQual_{S(BTS)}$ value from the $BER_{S(BTS)}$ measured in step 303. To transform the BER values to a logarithmic value is well known in the art.

According to a step 305, all the $RSS_{S(RU)}$, $RSS_{Nx(RU)}$, $RxQual_{S(Ru)}$ and $RxQual_{S(BTS)}$ values are transmitted from the radio unit 100 and the first base station 101 to the base station controller (BSC) 106 in FIG. 1a.

According to a step 306, a power-budget ($pbgt_S$) for the serving cell 102 is calculated by the BSC 106. The power-budget for the serving cell 102 is: $pbgt_S = RSS_S$-sens. The BSC 106 determines a communication-quality ranking value ($RANK_S$) for the serving cell which is equal to the power-budget value of the serving cell ($RANK_S = pbgt_S$).

According to a step 307, power-budgets ($pbgt_{Nx}$) for each neighbouring cell are calculated in the BSC 106. The power-budgets for the neighbouring cells are: $pbgt_{Nx} = RSS_{Nx}$-sens. The BSC 106 determines the communication-quality ranking value ($RANK_{Nx}$) for the neighbouring cells which are set to $RANK_{Nx} = pbgt_{Nx}$. There are two neighbouring cells in this scenario, hence a first ranking value $RANK_{N1}$ is determined for the first neighbouring cell 103 and a second ranking value $RANK_{N2}$ is determined for the second neighbouring cell 104.

According to a step 308, a communication-quality adjustment value ($RxQual_{x(Adj)}$) in dB is calculated in the BSC 106 for each neighbouring cell. The communication-quality adjustment value is calculated with the help of the following adjustment algorithm:

$$RxQual_{x(Adj)} = Cf(RxQual_S, RxQual_{Nx}) * f(t) - Cf(RxQual_S, U) * (f(t) - 1).$$

The adjustment algorithm can generally be described as an algorithm dependent on the communication-qualities of the involved cells and a first function of time f(t). $Cf(RxQual_S, RxQual_{Nx})$ is a first compensation factor in dB that is derived from a specified communication-quality compensation table, see table 1 below.

TABLE 1

Communication-quality compensation table

| RXQUAL$_S$ | RXQUAL$_{Nx}$ | | | | | | | |
|---|---|---|---|---|---|---|---|---|
| | 0 | 1 | 2 | 3 | 4 | 5 | 6 | 7 | U |
| 0 | 0 | 0 | −1 | −2 | −3 | −5 | −7 | −9 | −5 |
| 1 | 0 | 0 | −1 | −2 | −3 | −5 | −7 | −9 | −3 |
| 2 | +1 | 0 | 0 | −1 | −2 | −3 | −7 | −9 | +2 |
| 3 | +3 | +3 | +3 | 0 | −1 | −2 | −5 | −7 | +3 |
| 4 | +6 | +5 | +4 | +1 | 0 | −1 | −2 | −5 | +4 |
| 5 | +8 | +8 | +7 | +4 | 3 | 0 | −1 | −3 | +6 |
| 6 | +13 | +13 | +11 | +7 | +4 | +3 | 0 | −2 | +9 |
| 7 | +15 | +15 | +13 | +13 | +11 | +9 | +3 | 0 | +13 |

$Cf(RxQual_S, U)$ is a second compensation factor in dB that is also derived from the specified communication-quality compensation table 1.

The $RxQual_S$ value which is used to derive the first and second compensation factors is the highest of the $RxQual_{S(BTS)}$ and $RxQual_{S(RU)}$ values generated according to step 304.

The $RxQual_{Nx}$ value which is used to derive the first compensation factor is either known or unknown. The $RxQual_{Nx}$ value is known if that particular cell have been a serving cell for a radio unit which means that an $RxQual_{S(RU)}$ value and a $RxQual_{S(BTS)}$ value for that particular cell have been generated according to step 304. The highest of these two $RxQual_S$ values is stored in a memory in the BSC 106 so that it can be used as an $RxQual_{Nx}$ value for a radio unit in a neighbouring cell. The stored $RxQual_S$ value is only stored a predetermined time $T_{stored}$ which is 20 seconds in this embodiment. The time $T_{stored}$ is equal to a time $T_m$ described below in connection with a first function f(t). The $RxQual_{Nx}$ is unknown (U) if no old $RxQual_S$ value for that particular cell is stored in the memory in the BSC 106.

If the $RxQual_{Nx}$ is known the $RxQual_{Nx}$ columns 0–7 in table 1 is used together with the $RxQual_S$ value to derive the first compensation factor, e.g. if $RxQual_S = 4$ and $RxQual_{Nx} = 1$ the first compensation factor is +5 dB according to table 1.

If the $RxQual_{Nx}$ is unknown the U column in table 1 is used together with the $RxQual_S$ value to derive the first compensation factor, e.g. if $RxQual_S = 5$ and the $RxQual_{Nx}$ is unknown the first compensation factor is +6 dB (see column U) according to table 1. The U column in table 1 is always used to derive the second compensation factor $Cf(RxQual_S, U)$, e.g. if $RxQual_S = 4$ the second compensation factor is +4 dB according to table 1.

The first function f(t) of a time t $[0 \rightarrow T_m]$ starts at 1 and decreases to 0 after a predetermined time $T_m$. The first function can as an example be $f(t) = 1 - t/T_m$. The time $T_m$ is 20 seconds in this embodiment but can be set to other values dependent on the radio environment.

The (f(t)−1) is the first function minus 1 which means that it starts at 0 and decreases to −1 after the predetermined time $T_m$.

According to a step 309, a new (adjusted) communication-quality ranking value ($RANK_{Nx(new)}$) is calculated in the BSC 106 for each neighbouring cell with the help of the respective $RxQual_{x(Adj)}$ value from step 308. The new ranking values are calculated as: $RANK_{Nx(new)} = RANK_{Nx} + RxQual_{x(Adj)}$, where $RANK_{Nx}$ is the $RANK_{Nx}$ value generated in step 307 for the neighbouring cell in question, e.g. $RANK_{N1}$ for the first neighbouring cell 103.

According to a step 310, a sum of the $RANK_S$ value from step 306 and a handover margin value (HM) is compared to the new ranking value $RANK_{Nx(new)}$ calculated in step 309 for each neighbouring cell. This is done by the BSC 106 and in this scenario for two neighbouring cells 103, 104 respectively. If any of the $RANK_{Nx(new)}$ values exceeds the sum of $RANK_S$ and HM the method continues with a step 311. If not, the method continues with step 301. The HM value is added to the $RANK_S$ in order to prevent handovers back and forth between two cells for those radio units that are situated on a handover border between two cells. The HM value is determined in a known way. In this embodiment it is set to 3dB.

According to a step 311, the neighbouring cell (N-cell) with the highest $RANK_{Nx(new)}$ value is selected by the BSC 106 as a target cell 103. According to the scenario in FIG. 1b the first neighbouring cell 103 is selected as the target cell 103. Hence, $RANK_{N1(new)} > RANK_{N2(new)} > RANK_S + HM$, in this scenario.

This means that a compensation factor of −4 in table 1 delays a handover (reduces $RANK_{Nx(new)}$) and a compensation factor of +4 in table 1 advance a handover (increases $RANK_{Nx(new)}$).

According to a step 312, the BSC 106 determines that a handover is to be performed to the target cell 103 and orders the radio unit 100 and the base stations 101, 105 respectively to perform a handover between said cells. The method continues with step 301.

The compensation factors in table 1 are one example of a set of compensation factors that can be used in the method according to the present invention. The actual value of each compensation factor in table 1 is determined by the network characteristics. These compensation factors can be fixed for a certain cell, regularly updated by the radio communication system or chosen among a number of fixed sets of compensation factors stored in the BSC.

Figure 4A:
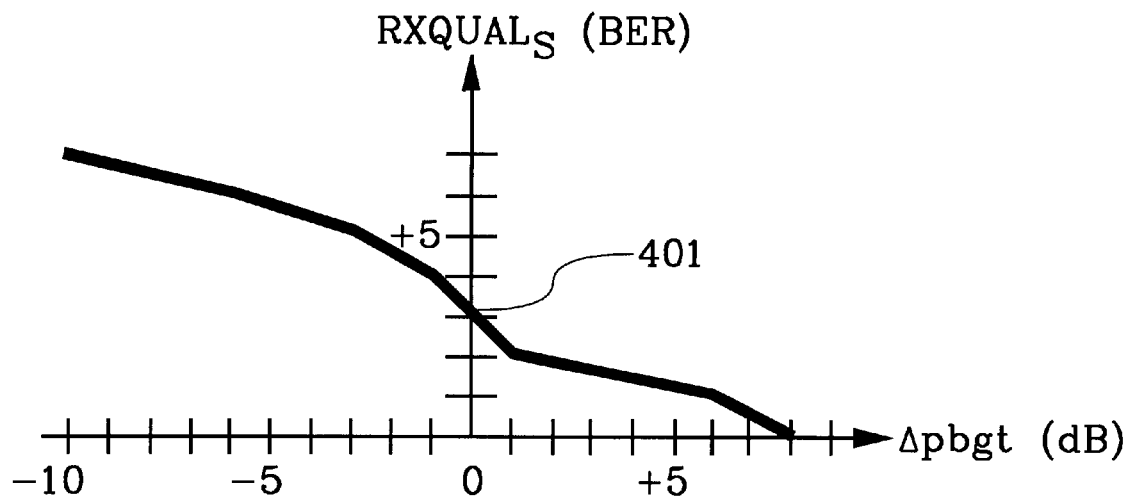
FIG. 4a is illustrating a first characteristic at a handover border according to the present invention.

FIG. 4a illustrates a characteristic of a first handover border 401 determined by the method according to the present invention. The first characteristic of the handover border 401 corresponds approximately to the U column (unknown $RxQual_{Nx}$) in the communication-quality compensation table 1. If the communication quality of the serving cell 102 in FIG. 1a is e.g. 5 (corresponding to a rather bad communication-quality) the radio unit 100 will perform a handover even if the Δpbgt is −3 dB (or higher). This means that the radio unit 100 will make the handover even if it is well inside the serving cell 102 (According to the power-budget characteristic 200 shown in FIG. 2 the handover would be made at Δpbgt=3.) If the communication-quality of the serving cell 102 is e.g. 1 (corresponding to a very good communication-quality) the radio unit will perform a handover if the Δpbgt is 6 dB (or lower) This means that the radio unit 100 will delay the handover unit until it is well inside the neighboring cell 103 (According to the power-budget characteristic 200 shown in FIG. 2 the handover would be made at Δpbgt=3.)

Figure 4B:
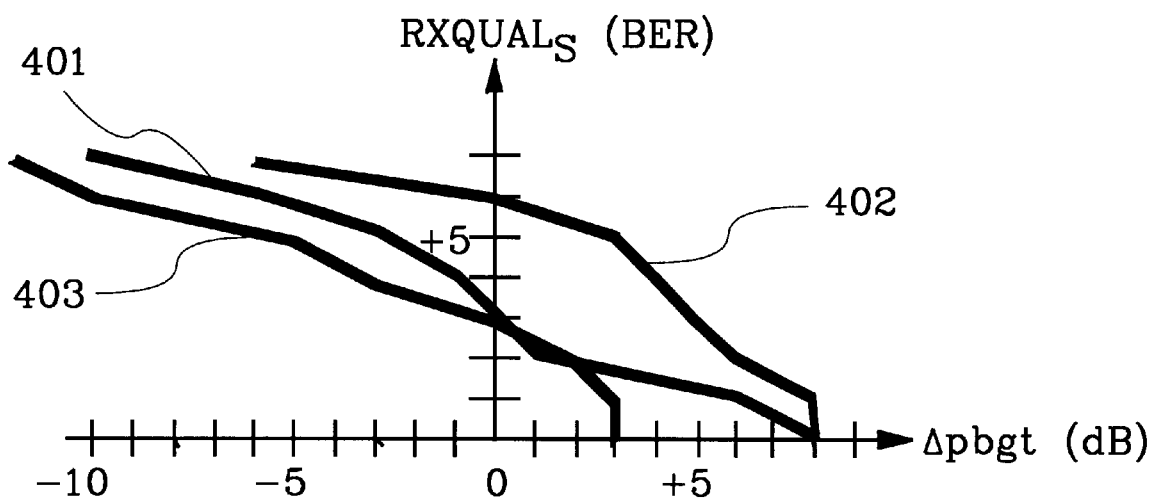
FIG. 4b is illustrating three characteristics at three different handover borders according to the present invention.

FIG. 4b illustrates a characteristic of three different handover borders 401–403 respectively determined by the method according to the present invention. The characteristics of the first handover border 401 have been described in connection with FIG. 4a above. The characteristic of the second handover border 402 corresponds approximately to the $RxQual_{Nx}=5$ column in the communication-quality compensation table 1. An $RxQual_{Nx}$ of 5 corresponds to a neighboring cell that when previously serving the radio unit 100 offered a poor communication-quality. A handover will be performed later (at a higher Δpbgt) compared to the characteristic of the first handover border 401 due to the known bad quality in the neighboring cell. The characteristic of the third handover border 403 corresponds approximately to the $RxQual_{Nx}=0$ column in the communication-quality compensation table 1. An $RxQual_{Nx}$ of 0 corresponds to a neighboring cell that when previously serving the radio unit offered a very good communication-quality. A handover will be performed earlier (at a lower Δpbgt) compared to the characteristic of the first handover border 401 due to the known good communication-quality in the neighboring cell. As seen in FIG. 4b, a number of different handover situations with different communication-qualities can be handled by the method according to the present invention.

Figure 5:
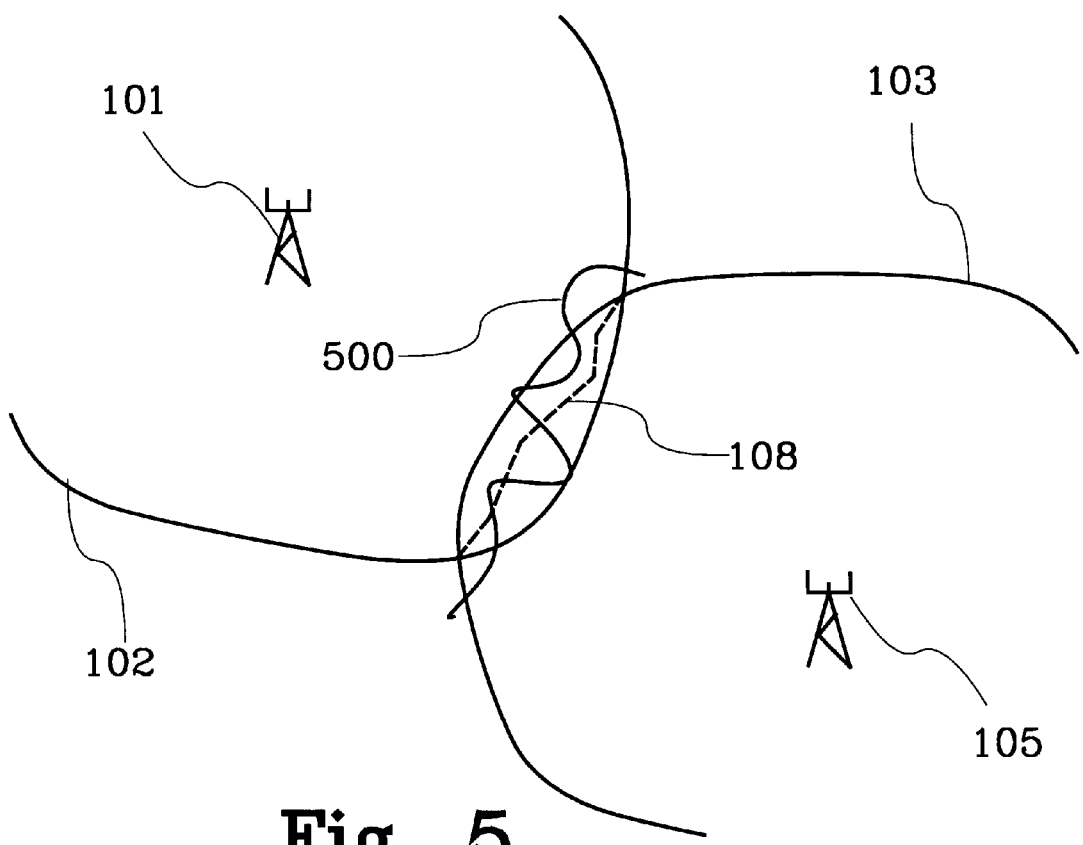
FIG. 5 is illustrating the scenario in FIG. 1b with a handover border according to the present invention.

FIG. 5 illustrates the same scenario as in FIG. 1b with the two base stations 101, 105 respectively, the two adjacent cells 102, 103 respectively and the power-budget handover border 108 between the cells. The continues line 500 illustrates a handover border between the two cells calculated by using the method according to the present invention which is optimized in terms of communication quality. As seen in the Figure the handover border 500 differs a lot from the power-budget handover border 108.

Figure 6:
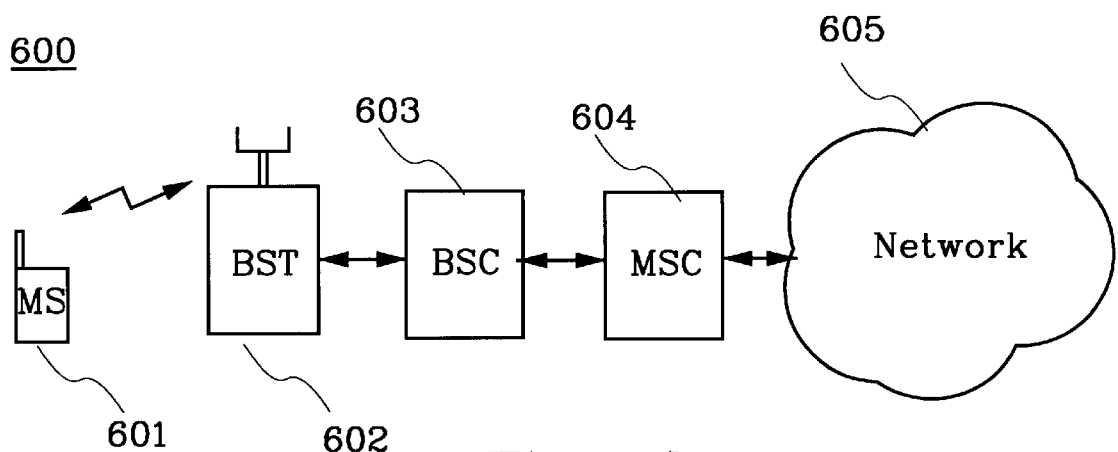
FIG. 6 is illustrating a block diagram of a communication system.

FIG. 6 illustrates a block diagram of a communication system 600 for utilising the method according to the present invention. The communication system 600 includes a radio unit 601, a base station 602 (also called a base transceiver station BTS) and a base station controller 603 connected to the base station 602. The base station controller 603 is connected to a mobile switching centre (MSC) 604 which is connected to at least one communication network 605, e.g. a PSTN. The radio unit 600 and the base station 602 comprises known circuits for measuring the BER and the received signal strength and transmitting them to the base station controller 603 according to step 301–305 in FIG. 3a.

Figure 7:
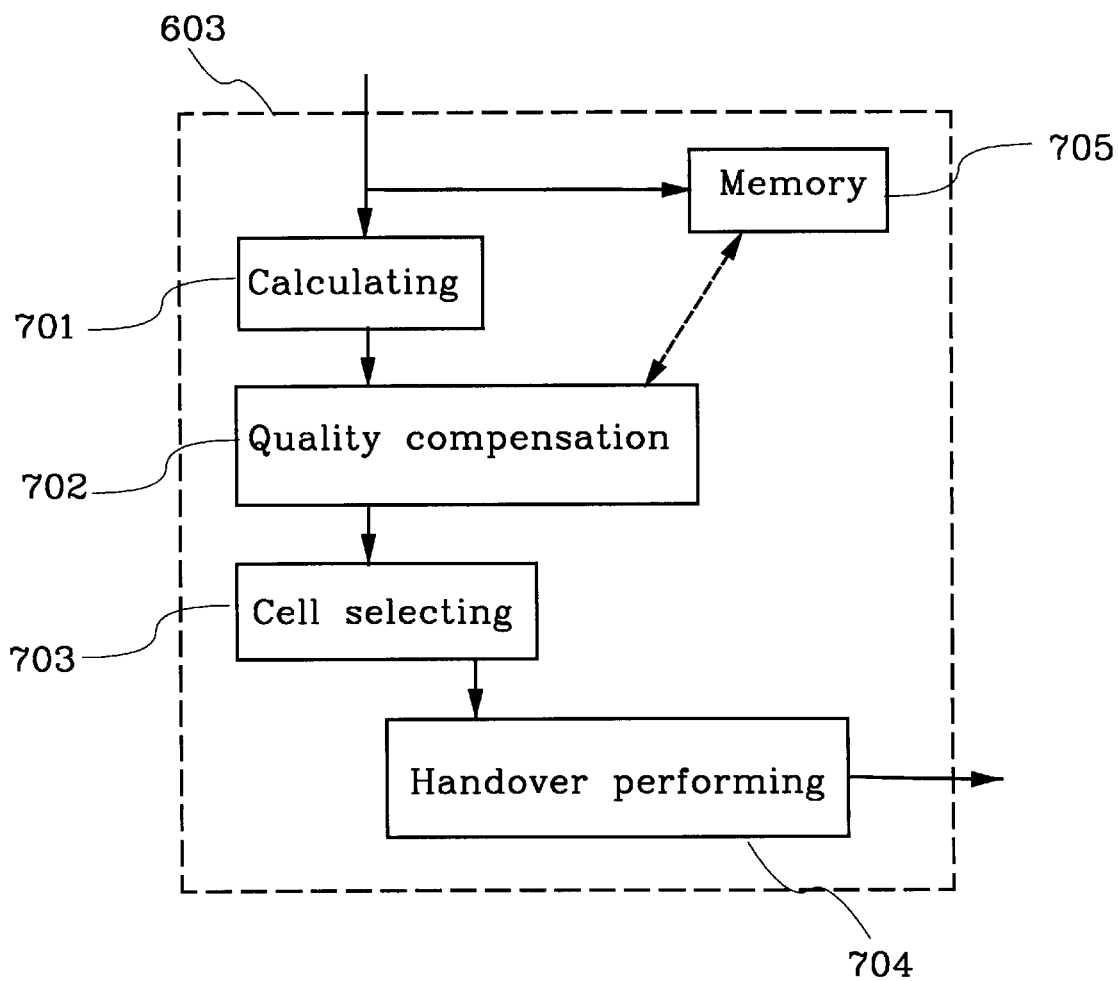
FIG. 7 is illustrating a block diagram of a base station controller.

FIG. 7 illustrates a block diagram of the base station controller 603 including an arrangement for carrying out the disclosed method and is including units for performing each method step. The units may perform each method step by way of hardware components, a computer programmed by appropriate software, by any combination of the two or in any other manner.

The base station controller 603 includes a calculating unit 701, a quality compensation unit 702, a cell selection unit 703, a handover performing unit 704 and a memory 705. The calculating unit 701 calculates the power-budget according to step 306 and 307 and the new ranking value according to step 308 and 309. The quality compensation unit 702, connected to the calculating unit 701, performs the ranking of all cells according to step 306–307. The cell selecting unit 703, connected to the quality compensation unit 702, selects which cell that should serve the radio unit according to steps 310–311. The memory unit 702, connected to the calculating unit 701 and quality compensation unit 702, stores the $RxQual_S$ value during the time $T_{stored}$. The handover performing unit 704, connected to the cell selecting unit 703, initiates and controls the handover to new cells according to step 312.

The first function f(t) can be replaced by a second function f(t,v) if the speed v of the radio unit 100 in the serving cell 101 in FIG. 1a is known. The second function f(t,v) is a function of the time t and the speed v. The second function starts at 1 and decreases to 0 as the first function f(t). When the speed is high the second function f(t,v) will decrease faster than when the speed is low.

What is claimed is:

1. A method in a radio communication system for determining a handover of a connection (C1) established between a radio unit (100) and a first base station (101) to a second base station (105), where said first base station (101) is serving a serving cell (102) and said second base station (105) is serving a neighbouring cell (103), said method comprising:
   a) measuring (301) of a first received signal strength ($RSS_S$) from said first base station (101);
   b) measuring (302) of a second received signal strength ($RSS_{Nx}$) from said second base station (105);
   c) measuring (303) at least a first ($RXQUAL_{S(RU)}$) and a second ($RXQUAL_{S(BTS)}$) communication-quality value in said serving cell (102); characterised in said method further comprising:
   d) calculating (306) a first power budget ($pdgt_S$) for said serving cell (102) from said first received signal strength ($RSS_S$);
   e) calculating (307) a second power budget ($pbgt_{Nx}$) for said neighbouring cell (103) from said second received signal strength ($RSS_{Nx}$);
   f) determining (306, 307) a first ranking value ($RANK_S$) for said serving cell (102) based on said first power budget ($pdgt_S$) and a second ranking value ($RANK_{Nx}$) for said neighbouring cell (103) based on said second power budget ($pbgt_{Nx}$);
   g) calculating (309) a new ranking value ($RANK_{Nx(new)}$) for said neighbouring cell (103) from said second ranking value ($RANK_{Nx}$), wherein said new ranking value ($RANK_{Nx(new)}$) is calculated (309) by adding a communication-quality adjustment value ($RxQual_{X(Adj)}$) to said second ranking value ($RANK_{Nx}$);
   h) determining (310) if said new ranking value ($RANK_{Nx(new)}$) exceeds said first ranking value ($RANK_S$);
   if so, perform a handover (312) of said connection (C1) from said first base station (101) to said second base station (105).

2. The method as claimed in claim 1, wherein said communication-quality adjustment value ($RxQual_{X(Adj)}$) is calculated (308) from one of said two communication-quality values in said serving call ($RXQUAL_{S(RU)}$, $RXQUAL_{S(BTS)}$) and a stored communication-quality value ($RXQUAL_{Nx}$) previously measured for said neighbouring cell (103).

3. The method as claimed in claim 2, wherein said communication-quality adjustment value ($RxQual_{(Adj)}$) is calculated (308) with the help of an adjustment algorithm.

4. The method as claimed in claim 3, wherein said adjustment algorithm includes a first ($Cf(RXQUAL_S, RXQUAL_{Nx})$) and a second ($Cf(RXQUAL_S, U)$) compensation factor.

5. The method as claimed in claim 4, wherein said compensation factors ($Cf(RXQUAL_S, RXQUAL_{Nx})$, $Cf(RXQUAL_S, U)$) are derived from at least one table (table 1) defining said compensation factors in dependence of a number of different communication-quality values for said serving cell ($RXQUAL_{S(RU)}$, $RXQUAL_{S(BTS)}$,) and corresponding communication-quality values ($RXQUAL_{Nx}$, U) for said neighbouring cell.

6. The method as claimed in claim 5, wherein said compensation factors (Cf ($RXQUAL_S, RXQUAL_{Nx}$), $Cf(RXQUAL_S, U)$ ) in said table (table 1) are updated at predetermined intervals.

7. The method as claimed in claim 3, wherein said adjustment algorithm also includes a function of time (f(t)) that starts at 1 and decreases to 0 after a predetermined time ($T_m$).

8. The method as claimed in claim 3, wherein said adjustment algorithm also includes a function of time and speed (f(t,v)) that starts at 1 and decreases to 0 after a predetermined time ($T_m$) and dependent on said speed (v).

9. The method as claimed in claim 1, wherein said communication-quality adjustment value ($RxQual_{X(Adj)}$) is calculated (308) from one of said two communication-quality values in said serving cell ($RXQUAL_{X(RU)}$, $RXQUAL_{X(BTS)}$) and a predetermined communication-quality value (U) for said neighbouring cell (103).

10. The method as claimed in claim 1, wherein said communication-quality values ($RXQUAL_{S(Ru)}$, $RXQUAL_{S(BTS)}$, $RXQUAL_{Nx}$) are the bit error rate ($BER_S, BER_{Nx}$).

11. The method as claimed in claim 1, wherein said first ranking value ($RANK_S$) is set to the same value as said first power budget ($pbgt_S$) and said second ranking value ($RANK_{Nx}$) is set to the same value as said second power budget ($pbgt_{Nx}$).

12. An arrangement in a radio communication system for determining a handover between a serving cell and a neighbouring cell, characterised in that said arrangement comprises:

means for calculating (701) a first power budget for said serving cell and a second power budget for said neighbouring cell based on measured received signal strengths in said cells;

means for determining (702) a first ranking value from said first power budget and a second ranking value from said second power budget;

means for calculating a new ranking value (701) for said neighbouring cell based on said second ranking value and a communication-quality adjustment value ($RxQual_{X(Adj)}$), wherein said communication-quality adjustment value ($RxQual_{X(Adj)}$) is dependent on a measured communication-quality ($RXQUAL_S$, $RXQUAL_{Nx}$, U) in said serving and neighbouring cell;

means for determining (703) if said new ranking value exceeds said first ranking value and, if so, selecting said neighbouring cell as a target cell; and means for initiating a handover (704) to said target cell.

13. The arrangement as claimed in claim 12, wherein said communication-quality adjustment value ($RxQual_{X(Adj)}$) is further dependent on a function of time (f(t)).

14. The arrangement as claimed in claim 13, wherein said function of time (f(t)) starts at 1 and decreases to 0 after a predetermined time ($T_m$).

15. The arrangement as claimed in claim 12, wherein said dependency of said communication-quality of said serving and neighbouring cell is defined in a communication-quality compensation table (table 1).

* * * * *